May 31, 1966   J. G. WARHOL   3,253,481
REMOTE CONTROL DEVICE OPERATED BY CABLES
Filed Dec. 18, 1963
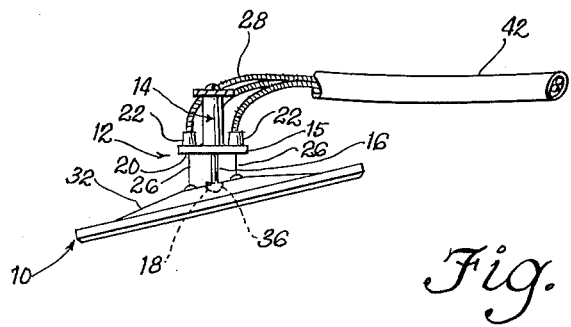
Fig. 1
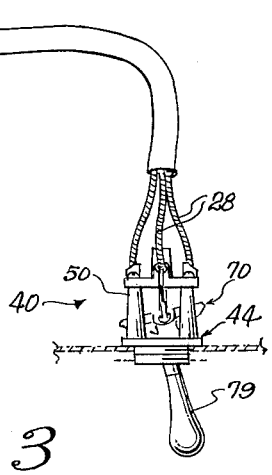
Fig. 2
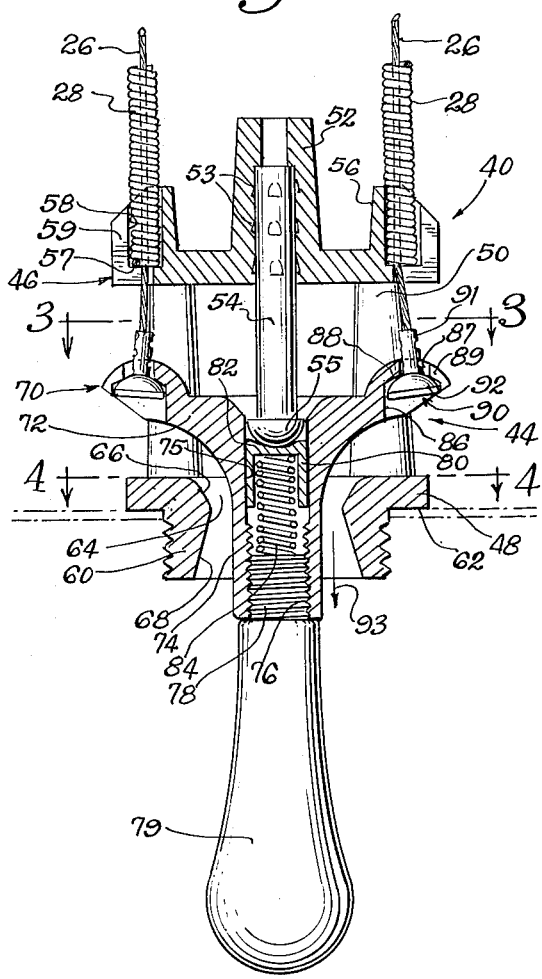
Fig. 3
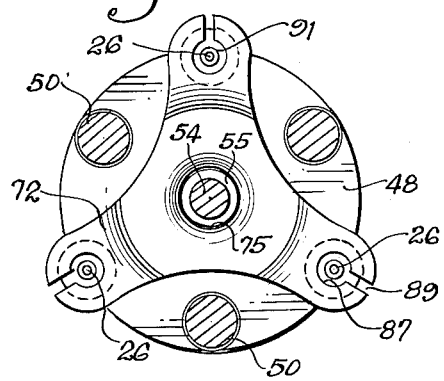
Fig. 4
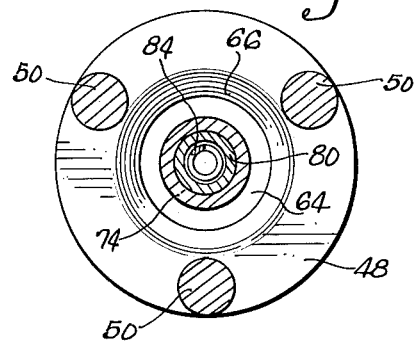
INVENTOR.
John G. Warhol
BY Max R. Kraus
Att'y

United States Patent Office 3,253,481
Patented May 31, 1966

3,253,481
REMOTE CONTROL DEVICE OPERATED
BY CABLES
John George Warhol, Oak Park, Mich., assignor to Nelmor Corporation, Harper Woods, Mich., a corporation of Illinois
Filed Dec. 18, 1963, Ser. No. 331,453
7 Claims. (Cl. 74—501)

This invention relates to a remote control device operated by cables.

One of the objects of this invention is to provide a cable operated remote control device, for example, such as a rear view mirror or the like, in which the control member includes a fixed pivot support and a pivotal member pivotally supported thereon and in which resilient means are associated with the pivotal member for urging the pivotal member axially away from the fixed pivot support to tension the cables.

Another object of this invention is to provide a device of the foregoing character in which a single spiral spring is supported in an axial bore in the pivotal member to urge the pivotal member axially away from its fixed pivot support to tension the cables and wherein the pivotal member has no seating engagement at the rear thereof.

Other objects will become apparent as this description progresses.

In the drawings:

FIG. 1 is a top view of the device embodying this invention.

FIG. 2 is an enlarged sectional view of the control member.

FIG. 3 is a view taken on lines 3—3 of FIG. 2, and

FIG. 4 is a view taken on lines 4—4 of FIG. 2.

The controlled member, which in the embodiment shown is the rear view mirror unit, is shown in FIG. 1 of the drawings. The mirror unit generally indicated at 10 is adapted to be mounted on a fender for example, or any desired location on the exterior of the vehicle so as to be in view of the driver and reflect the view rearwardly of the vehicle. The mirror unit 10 includes a bracket 12 having an elongated body 14 provided with a plate 15 at the front end integrally formed therewith. The body 14 has an axial bore which may be threaded to receive a threaded support member 16 which also extends through an alined threaded opening in the plate 15.

The threaded support member 16 has an enlarged semispherical shaped pivot head 18 which forms a fixed pivot support for the mirror. The support member 16 is adjustable axially with respect to the body 14 and plate 15. It may be preset or be made permanently affixed without adjustment if desired.

The plate 15 is provided with three openings, all of which are identified by the numeral 20, which are equally spaced around the axial bore of the body 14, and which communicate with rearwardly extending correspondingly alined sleeve portions 22, each provided with an internal shoulder. The sleeves 22 provide the sockets for receiving the terminals of the armor or covering for the cables.

There are three cables, all designated by the numeral 26 and each cable is covered by an armor or covering designated by the numeral 28. Each cable, which may be formed of wire, is freely slidable within its respective covering or armor 28.

The end of each of the cables 26, for connection to the mirror unit 10, passes through its respective sleeve 22 and corresponding opening 20 in the plate 15 and is affixed to the mirror unit 10 by having the ends of the cables permanently attached in any conventional manner to the back plate 32 of the mirror assembly. The connections between the cables 26 and the mirror unit 10 are equally spaced around the axis of the mirror. The end of each armor or cable covering 28 is confined within its respective sleeve socket 22. If braided cables are used the cables may be passed through openings in the back plate 32 and may be crimped, knotted, or the like, to interlock therewith.

The mirror assembly or mirror unit generally indicated at 10 has the aforementioned back plate 32 which is adapted to support a reflective mirror 34. The back plate has a center portion which arches away from the reflective mirror and the center thereof corresponding to the mirror axis has a concave or socket portion 36 which engages and fits on the semi-spherical pivot head 18 of the support member 16. Support member 16 is a fixed support for the pivotal movement of the mirror member.

The mirror unit 10 is adapted to be exteriorly supported on an automobile. The mirror member 32–34, including the body member 14, plate 15, and the exposed cable coverings 28, shown in FIG. 1, at the mirror end may be enclosed within a housing (not shown) which does not interfere with the pivotal movement of the mirror assembly or the mirror unit. The cables 26 and their respective coverings 28 will extend into the interior of the car where the control assembly or control unit, generally indicated at 40, is positioned. The control assembly is secured generally within easy access of the operator, preferably on the dashboard. Thus, by operating the control unit 40 in the car, the controlled member or mirror unit 10 exteriorly of the car is adjustably positioned.

The three cables within their respective coverings are also enclosed within a larger flexible tubing indicated by the numeral 42 which keeps them together but does not interfere with their respective operation. The opposite ends of the cables 26 are connected to the control unit 40 and same will now be described.

The control assembly or control unit 40 is supported in a frame or cage-like member generally indicated at 44 which has a front frame member 46 and a rear frame member 48 spaced therefrom and joined together by three equally spaced posts 50 which are formed integrally with the rear frame member 48 and which extend horizontally and forwardly for connection to the front frame member 46. The front frame member 46 has integrally formed therewith a forwardly extending sleeve 52 for receiving a support member 54 having a semi-spherical shaped head 55. The support member 54 is fixedly secured in the sleeve 52 by means of the barbs 53 engaging the sleeve and provides a fixed support for the pivotal member to be described. If desired, it may be made axially adjustable by providing the sleeve 52 with internal threads and providing the support 54 with externally engaging threads. In any case, the support member 54 is in a fixed position during its operation.

The front frame member 46 has integrally formed therewith three equally spaced radially disposed forwardly extending sleeve portions 56, each provided with a rear shoulder 57 which forms a socket to receive the end of the cable covering or armor 28, as best seen in FIG. 2. The cables extend through openings 58 in the front frame member 46 which are alined with the sockets for attachment to the pivotal control member, to be described. The sleeves 56 are each provided with an outwardly opening longitudinal slot 59 communicating with the opening 58 and through which the cable may be passed in initially securing same to the pivotal member.

The rear frame member 48 is provided with a rearwardly extending externally threaded tubular portion or extension 60 which is spaced inwardly of the outer circumference of the rear frame member 48 to provide a shoulder 62. The threaded extension 60 extends through a suitable opening in a bracket (not shown) and is engageable by a threaded nut for securing the control member to the bracket. The bracket is secured to the interior of the vehicle near the driver, for example, the instrument panel.

The rear frame member 48 has an enlarged central opening 64 communicating with the tubular extension 60 providing a tapered shoulder 66 therebetween. The inner wall of the tubular extension flares outwardly as at 68 to accommodate the swivel or pivotal movement of the rear of the pivotal member.

The pivotal control member generally indicated at 70 is pivotally supported on the support member 54 within the frame or cage-like member 44 for pivotal movement. The pivotal member 70 has three radially equally spaced front sections or arms 72 which merge into a rearward extension 74 to form the body for the pivotal member. The body of the pivotal member is provided with a central bore 75, the rear of which is internally threaded as at 76 to receive the threaded end 78 of a handle member 79.

Slidably supported in the front end of the bore 75 is a sleeve 80 having a concave end wall 82 within which is supported one end of a spiral spring 84. The opposite end of spring 84 extends inside the bore and rests against the end 78 of the handle 79. The concave end wall 82 engages the semi-spherical head 55 of the support 54.

The arms 72 of the pivotal control member 70 extend between the spaced posts 50 and do not make contact therewith during the pivoting of the pivotal member. Each of the outer ends of the arms 72 has a transversely extending bore 86 which communicates with a reduced opening 87 in the front thereof to provide an intermediate shoulder 88. Each of the bores 86 forms a socket for receiving the end of the cable and the plug connected thereto. The three sockets are thus radially and equally spaced. Each socket has a communicating slit 89 which opens outwardly to permit the cable to be inserted from the exterior through the slit.

Permanently secured to the end of each of the cables is a terminal or plug member 90 having a sleeve portion 91 and an enlarged head 92. The end of the cable extends into the sleeve 91 and is permanently affixed thereto in any conventional manner. The terminal or plug 90 is positioned in the bore 86 forming the socket. The spiral spring 84 normally urges the slidable sleeve 80 in the direction of and toward the pivot or bearing point 55. Simultaneously, the said spring urges the pivotal member 70 in the opposite direction, as indicated by the arrow 93 in FIG. 2. This causes a tensioning of the cables between the mirror unit or the controlled member 10 and the control member 40. In view of the tensioning means at the axis of the pivotal control member 70 a uniform and equal tensioning of the cables is effected. Also, this construction eliminates a socket or seat at the rear end of the pivotal member. It will be noted that the rear of the pivotal member 70 has no support or contact with any socket seat but is spaced from the rear frame member 48. The pivotal member 70 is in engagement with only a single central pivot support at the front end, indicated by the numeral 55.

The tensioning of the cables may be adjusted, such as by rotating the handle 79, causing the handle to move axially in the bore 75 and thereby compress or lessen the compression of the spiral spring 84 within the bore, causing it to exert a greater or lesser pressure against the pivotal control member 70.

This construction is a very simple, effective and efficient device which can be economically manufactured.

It will be understood that various changes and modifications may be made from the foregoing without departing from the spirit and scope of the appended claims.

What is claimed is:

1. A mechanism for remotely controlling a controlled member for universal movement comprising a control assembly including a universally pivotally supported control member pivoting upon a fixed pivot member, said pivoting control member having a central bore, a plurality of cables having their opposite ends connected to said controlled member and to said control member, a resilient member supported in said central bore and acting against said fixed pivot member to normally urge said pivoting control member axially away from said fixed pivot member to tension said cables.

2. A structure defined in claim 1 in which the resilient member is a spiral spring.

3. A structure defined in claim 1 in which means are positioned in said bore between the resilient member and the pivot member for acting against the pivot member.

4. A structure defined in claim 3 in which the means comprises a sleeve in the bore with a concave end wall to act against the pivot member.

5. A structure defined in claim 1 in which the pivoting control member has a handle which is axially adjustable for the purpose of increasing the compression of the resilient member and thereby increase the tension of the cables.

6. A structure defined in claim 1 in which the control assembly includes a cage-like frame member having spaced front and rear frame members, with the control member pivotally supported and out of engagement with said front and rear frame members.

7. A structure defined in claim 1 in which the control assembly includes a frame support for the fixed pivot member and wherein the pivoting control member is maintained in spaced relation from the rear of the frame support.

References Cited by the Examiner

UNITED STATES PATENTS

| | | | |
|---|---|---|---|
| 372,281 | 10/1887 | Whitney | 74—561 X |
| 1,116,571 | 11/1914 | Danver | 287—90 |
| 1,612,792 | 1/1927 | Asbury. | |
| 1,699,657 | 1/1929 | Fagan | 74—519 X |
| 2,049,163 | 7/1936 | Hufferd | 287—90 |
| 2,302,901 | 11/1942 | Wahlberg | 74—484 |
| 2,439,356 | 4/1948 | Arens | 74—470 |
| 2,610,469 | 9/1952 | Rowland. | |
| 2,931,245 | 4/1960 | Jacobson. | |
| 3,046,840 | 7/1962 | Barcus | 88—93 |
| 3,077,142 | 2/1963 | Jacobson | 88—98 X |
| 3,085,447 | 4/1963 | Shay | 74—501 X |
| 3,096,664 | 7/1963 | Walsh | 74—501 |
| 3,183,736 | 5/1965 | Jacobson | 74—501 |
| 3,204,524 | 9/1965 | Moore | 88—98 |

MILTON KAUFMAN, *Primary Examiner.*

BROUGHTON G. DURHAM, *Examiner.*

C. F. GREEN, *Assistant Examiner.*